No. 814,246. PATENTED MAR. 6, 1906.
M. STRANSKY.
BAIL SUPPORTING DEVICE.
APPLICATION FILED DEC. 6, 1904.
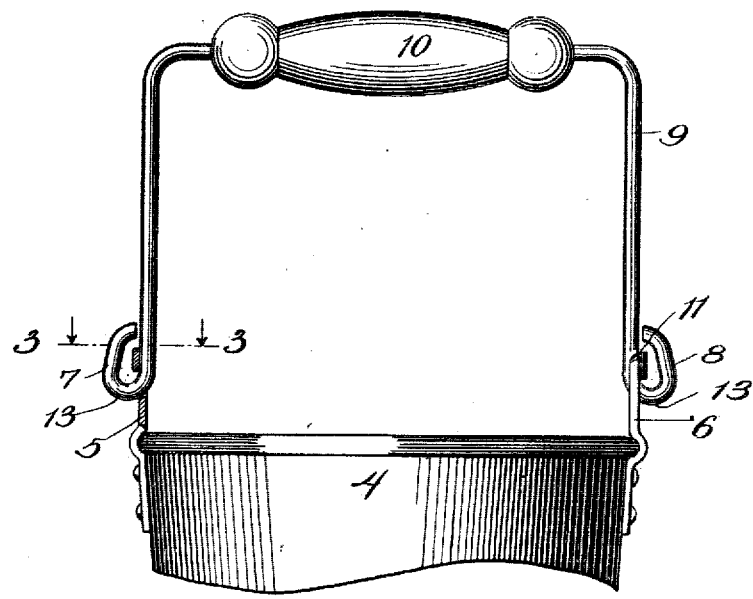
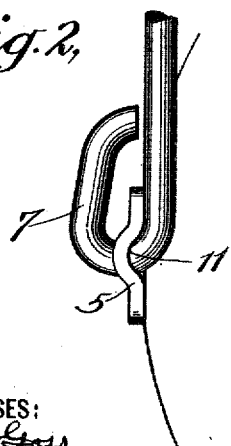
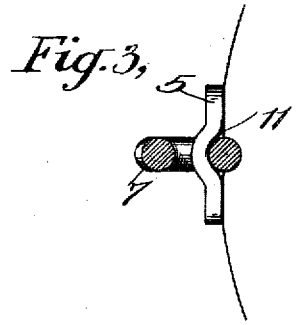
WITNESSES:
INVENTOR
Maurice Stransky
BY
ATTORNEY

UNITED STATES PATENT OFFICE.

MAURICE STRANSKY, OF NEW YORK, N. Y.

BAIL-SUPPORTING DEVICE.

No. 814,246.   Specification of Letters Patent.   Patented March 6, 1906.

Application filed December 6, 1904. Serial No. 235,715.

*To all whom it may concern:*

Be it known that I, MAURICE STRANSKY, a citizen of the United States, residing at New York, in the county of New York and State of New York, have invented certain new and useful Improvements in Bail-Supporting Devices, of which the following is a specification.

This invention relates generally to kitchen or household utensils, and particularly to metal containing vessels designed to be subjected to heat. As is well known, these vessels, of which pots and kettles are examples, are generally provided with a bail which is pivotally secured to the vessel in order to provide for the removal of a cover, with which operation the bail in its normally upright position would interfere. These bails are generally formed from heavy wire, provided with a wooden handle, and each end thereof bent into the form of a hook which is passed through an aperture in a lug or bracket permanently secured to the handle. When the vessel is in a position of rest, the bail being in unstable equilibrium will under the force of gravity drop until it rests against the side of the vessel. When the vessel is subjected to heat, therefore, the handle will become heated possibly to the point of destruction and certainly to the point of causing pain or discomfort when subsequently grasped by the user.

The object of the present invention is to provide a simple and effective construction which will serve to retain the bail in a normally upright position and the handle free from contact with the sides of the vessel and yet easily moved to one side or the other to permit of the removal or replacement of the cover when desired.

A further and a particular object is to accomplish the above result by a structure so simple that the cost of manufacture of such articles and the retail cost to the consumer will not be increased.

I am aware of the existence of other devices for retaining the bail of a vessel of this class in an upright position, none of which, however, are thought to possess the features of simplicity and efficiency of the present invention, which consists generally in a vessel of this class provided with a pair of apertured lugs and a bail having its opposite extremities hooked in said apertures, at least one of said lugs being provided with a vertical groove into which a vertical portion of the bail is spring-pressed by its own elasticity, whereby said bail will be checked in an upright position, yet capable of being pivotally moved to one side or the other by the application of slight manual force, the aperture in the grooved lug being relatively large compared with the diameter of the wire, whereby as the extremity of the bail is forced outwardly and into said vertical groove the short horizontally-disposed portion of the hook or loop which has formed the pivot-bearing is forced outwardly and downwardly from its seat, thereby locking said bail more firmly against pivotal movement and tending to render necessary a slight raising of the bail with respect to the kettle to return said pivot-bearing to its seat and permit of pivotal movement.

My invention will be more readily understood by reference to the accompanying drawings, forming a part of this specification, and in wich—

Figure 1 is an elevation of the top or upper portion of a vessel of the class described with my invention applied thereto. Fig. 2 is an enlarged top plan of one end of the bail and its connection in a different position of adjustment. Fig. 3 is a section on the line 3 3 of Fig. 1.

Referring now to the drawings in detail, numeral 4 refers to the top or upper portion of a pot or kettle to which is secured in any common or well-known manner the oppositely-located lugs or brackets 5 and 6. These lugs or brackets are apertured to receive the hooked or looped extremities 7 and 8, respectively, of the bail 9, which should be formed from heavy spring-wire, through its own elasticity exerting at its extremities an expanding pressure against said lugs or brackets. This bail may be provided with the usual wooden handle 10. To this point I have described nothing more than a common and well-known form of utensil of this class, and under heretofore-existing conditions the bail 9 would be free to swing pivotally from one side of the vessel to the other and would normally assume a position of rest with the handle 10 resting on the side of the vessel or in some constructions in at least close proximity thereto. In either case when the vessel is heated the handle will become hot, and in order to retain the bail in a normally upright position yet capable of ready manipulation from side to side when desired I provide at least one of said lugs, and preferably both thereof, with a vertical groove 11, extending from the aperture in said lug to the upper extremity thereof. This groove is adapted to receive a vertical portion of the bail 9, which is, as explained, spring-pressed therein when said bail is in an upright position. In order that there may be sufficient freedom of movement of the end of said bail, the aperture in the lug must be sufficiently large to provide for lateral movement of the curved portion of the bail between the substantially horizontal bearing portion 13 thereof and said vertical portion.

The expansion of the ends of the bail into the groove is in itself sufficient to provide for the proper performance of the desired function of the device. It will be noted, however, that the ends of the bail in expanding, if the aperture in the lug (or both thereof) is of proper size, will, through movement of the wire through said aperture on account of the curve or bend in said wire, force the substantially horizontal bearing portion 13 thereof downwardly as well as outwardly and off its seat, whereby said bail is more securely held in an upright position against accidental dislodgment, yet capable of being swung to either side upon the application of sufficient manual force or by being slightly raised to reseat said bearing portion or portions prior to the exertion of the lateral pressure.

Many modifications of the minor details of my improved bail-support will doubtless readily suggest themselves to those skilled in the art to which such devices appertain, and I therefore do not desire to limit my invention to the specific details of construction herein shown and described.

Having thus described my invention, I claim as new and desire to secure by Letters Patent—

1. In a vessel or utensil of the class described, the combination of a pair of lugs each having an aperture therein and at least one of which is provided with a vertically-arranged groove terminating in said aperture, and a bail having its ends looped and each loop comprising a horizontal pivotal portion, a straight portion at right angles thereto and an inclined portion therebetween, the ends of said bail being outwardly spring-pressed, whereby when said vertical portion is in said groove said pivotal portion is projected through said aperture to completely unseat the same.

2. In a vessel or utensil of the class described, the combination of a pair of lugs each having an aperture therein and at least one of which is provided with a vertically-arranged groove, and an outwardly spring-pressed bail pivoted in said apertures, the aperture in the grooved lug being relatively larger than the cross-sectional area of said bail and the corresponding end of said bail being provided with a horizontal pivotal portion, a straight portion at right angles thereto and an intermediate inclined portion, whereby, when said bail is in an erect position and said straight portion spring-pressed into said groove, said pivotal portion is forced completely out of its seat.

In testimony of the foregoing I have hereunto set my hand in the presence of two witnesses.

MAURICE STRANSKY.

Witnesses:
 JACOB STRAND,
 W. L. FAULK.